United States Patent Office 3,600,278
Patented Aug. 17, 1971

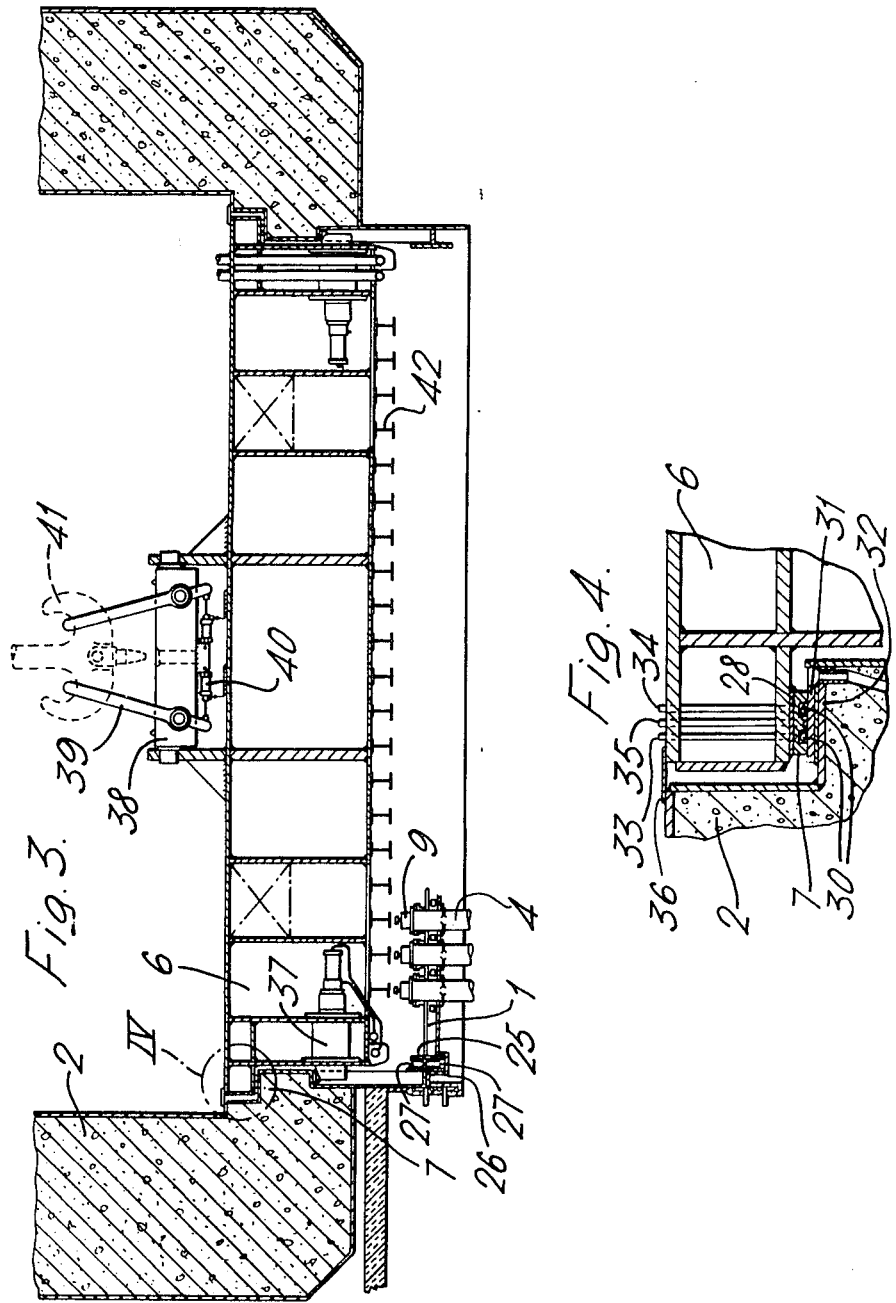

2,600,278
NUCLEAR REACTOR INSTALLATIONS
William Birch, Middlewich, and Christopher Powell, Tunbridge Wells, England, assignors to United Kingdom Atomic Energy Authority, London, England
Filed Mar. 1, 1968, Ser. No. 709,734
Int. Cl. G21c 19/00
U.S. Cl. 176—61                                           6 Claims

ABSTRACT OF THE DISCLOSURE

A nuclear reactor has vertically extending fuel tubes which terminate in a pond above the core. A flexible tube plate is penetrated by the fuel tubes and forms the base of the pond containing structure. The tube plate is supported from flanges on the tubes.

BACKGROUND OF THE INVENTION

This invention relates to nuclear reactor installations wherein the nuclear fuel is housed in pressurized coolant conducting tubes which extend upwardly into a pond of water located above the reactor and into which irradiated fuel elements can be withdrawn.

SUMMARY OF THE INVENTION

According to the invention, in a nuclear reactor installation comprising a pressurized coolant circuit including vertically disposed tubes for containing nuclear fuel, the tubes having closable extensions for conducting fuel into and out of the tubes and terminating in a pond located above the reactor, the floor of the pond containing structure is formed by a flexible tube plate which is peripherally sealed to the side wall or walls of the structure and is supported by the extensions. The extensions provide evenly distributed support struts for the submerged flexible tube plate which can deflect without causing leakage to accommodate differential thermal linear expansion of the tubes and extensions.

Conveniently, in a steam generating installation there are at least two pressurized water coolant circuits, each circuit including a group of tubes with extensions and the tube plate divided into flexibly interconnected sections sealed together by a flexible membrane or membranes, each section being supported by the extensions of one group of the tubes. In the event of one circuit becoming depressurized the resultant differential thermal expansion of the circuits can be accommodated by deflection of one section relative to another.

Preferably, within the pond containing structure there is a removable plug which forms part of a primary containment structure for the reactor, the plug being sealable to the wall of the pond containing structure so that the tube plate can be isolated from water of the pond.

DESCRIPTION OF THE DRAWING

A nuclear reactor installation will now be described by way of example with reference to the accompanying drawings of which:

FIG. 3 is a fragmentary side view of part of FIG. 1 also drawn to a larger scale, FIG. 4 is a fragmentary side view of a detail designated IV of FIG. 3 and drawn to a larger scale.

DESCRIPTION OF THE PREFERRED EMBODIMENTS

Figure 1:
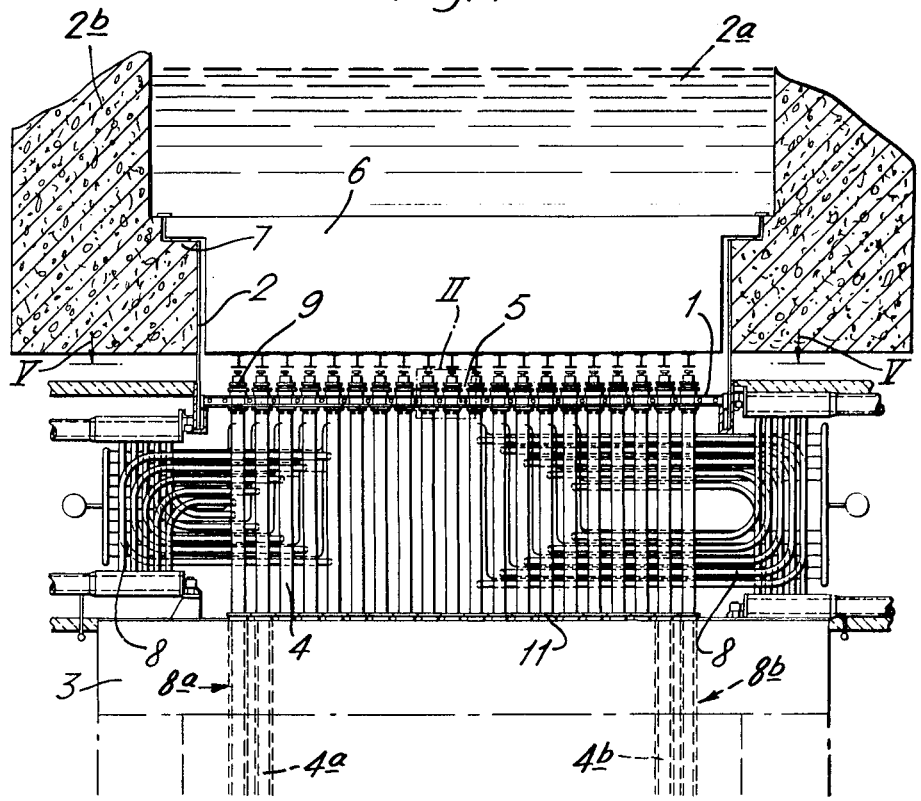
FIG. 1 is a fragmentary side view in section of the installaion.
Figure 2:
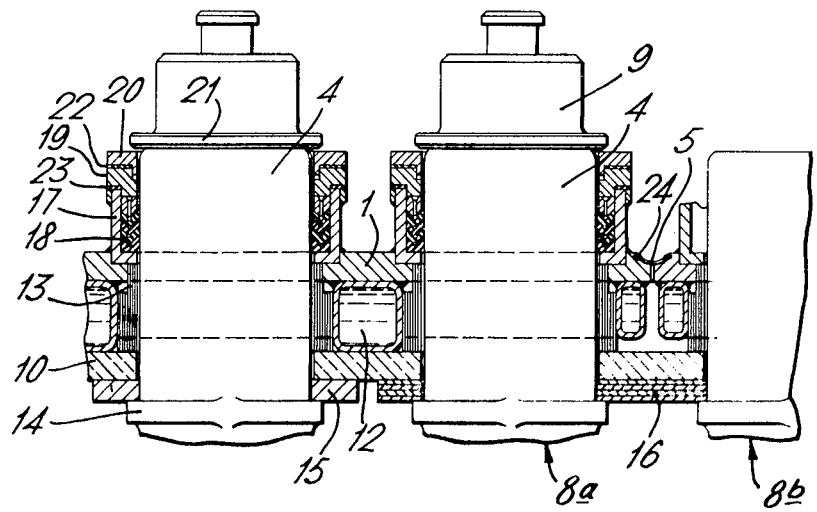
FIG. 2 is a fragmentary side view of the part of FIG. 1 contained within the box designated II, and drawn to a larger scale.
Figure 5:
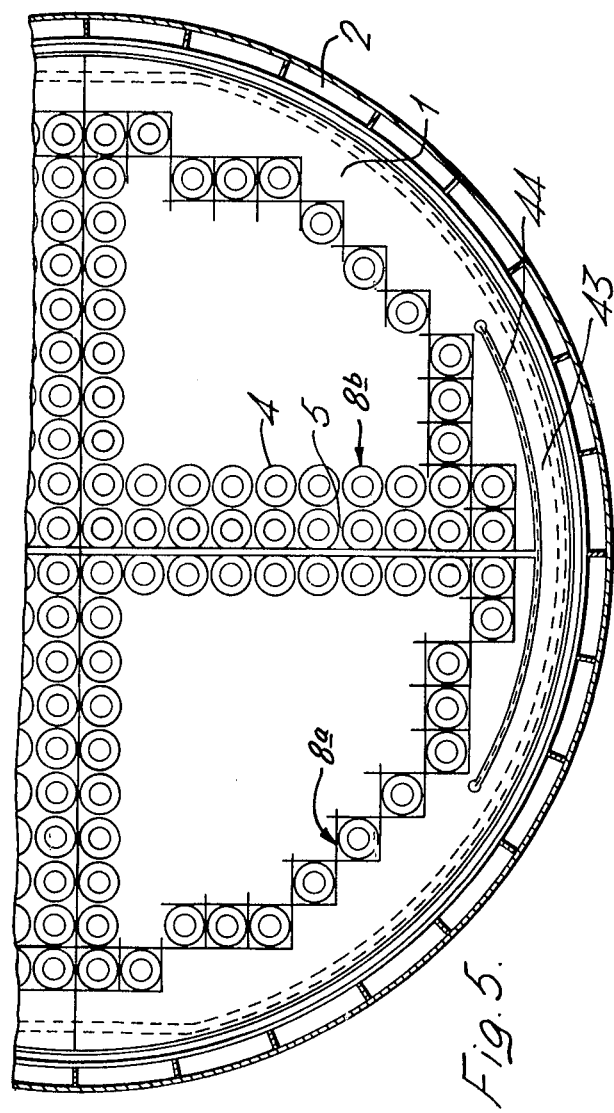
FIG. 5 is a fragmentary plan view in section on line V—V.

In FIG. 1 there is shown part of a nuclear reactor installation comprising two pressurized coolant circuits 8a, 8b including vertically disposed tubes 4a, 4b for containing fuel. The tubes have extensions hereinafter termed standpipes 4 for conducting fuel into and out of the tubes and the standpipes 4 terminate in a pond of water 2a located above the reactor. A circular flexible tube plate 1 is sealably connected at its periphery to the side wall 2 of the structure (designated 2b) containing the pond 2a and is supported by the standpipes 4 which are gland sealed into the tube plate. The tube plate is substantially divided into two semi-circular sections by a diametral slit, the sections being sealed together across the diameter of the tube plate by a flexible membrane 5 (FIG. 2). The sections are joined together at the periphery by flexible links 43 formed by arcute slots 44 which define extensions to each end of the diametral slit and are disposed parallel to the periphery of the tube plate as shown in FIG. 5. The standpipes of each coolant circuit 8a, 8b form a group and each section of the tube plate is supported by standpipes of one of the groups. Within the pond structure there is a removable plug 6 which forms part of a primary containment structure for the reactor core and for part of the reactor coolant circuit. The plug is sealable at 7 to the side wall 2 so that the tube plate 1 is isolated from the water of the pond. When the plug 6 is removed from the pond containing structure the tube plate forms a floor for the structure.

The nuclear reactor is of the steam generating, heavy water moderated kind wherein the moderator is contained in a calandria vessel (which forms no part of the present invention and is therefore indicated only in broken lines in FIG. 1) through which the pressure containing tubes of circuits 8a and 8b pass. Cooling water is passed over the fuel in heat exchange to generate steam and a mixture of steam and water is passed from the pressure tubes to steam drums where the steam is separated from the water and conducted to a turbine. The water is recirculated to the pressure tubes. The pipework designated 8 in FIG. 1 is for conducting the coolant from the pressure tube standpipes 4 to the steam drums (not shown). The pipework connects with the standpipes 4 via side branches, and closable upper extensions of the tubes 4a, 4b are constituted by the standpipes 4 which are closed by closure plugs 9 when the reactor is operating. The calandria vessel is enveloped by tanks containing ordinary water which serves as a neutron shield, the upper tank being shown at 3. The standpipes 4 are supported by flanges 11 from the upper neutron shield tank.

The tube plate 1 (shown in greater deail in FIG. 2) is penetrated by three hundred standpipes arranged in a square lattice pitch and has cooling water pipes 12 attached to its underside. The tube plate is thermally insulated from the reactor core by insulation 10 and the water pipes 12 are thermally insulated by insulation 13 embracing the standpipes. The tube plate 1, water pipes 12 and insulation 10 are supported by integral flanges 14 on the standpipes 4 and by loose support flanges 15. At each side of the diametral joint between the semi-circular sections of the tube plate, the tube plate is supported at the centre by laminated interlinking flanges 16 which bridge the joint and are carried by the integral flanges 14 of the standpipes 4 on each side of the joint. The tube plate has gland packing boxes 17 on the upper side at each standpipe perforation. Gland packing 18 in the boxes embraces the standpipe and is compressed by a gland plate 19. A restraint plate 20, for co-operating with a flange 21 on the closure plug 9 of each standpipe in a manner to be described, is positionally adjustable by shims 22. The gland plate is positionally adjustable relative to the gland box by shims 23. The tube plate 1 and flexible membrane 5 are of stainless steel the latter being sealably attached to the semi-circular sections of the tube plate 1 by welds 24. Reference to FIG. 3 shows that the tube plate has a peripheral skirt 25 which is sealed to a skirt 26 of the wall 2 of the pond by two reinforced rubber seals 27.

The plug 6 is of generally cylindrical shape and is of fabricated box construction. It is sealed at 7 (as shown in FIG. 4) by a peripheral seal plate 28 having two concentric grooves which house inflatable rubber sealing rings 30. The sealing rings seat on an annular plate 31 which is supported by a step 32 in the wall 2 of the pond. Ducts 33, 34, 35 are for pressurizing the sealing rings 30 and for interspace sampling. A cover 36 is provided to prevent debris from the pond falling into the annular clearance between the plug 6 and the wall of the pond. The plug is removably secured by hydraulically operated latches 37 and has a lifting beam 38 permanently attached. The lifting beam has pivotable shackles 39 which are actuated by hydraulic rams 40 to engage and disenage with a ramshorn lifting hook 41 shown in broken lines. Rolled steel joists 42 are bolted to the underside of the plug 6 and lie on one set of co-ordinates of the lattice pitch of the standpipes 4.

When the reactor is operating the plug 6 is in the position shown to isolate the tube plate 1 from the water of the pond. The interspace between the tube plate and plug can be drained of water. To remove fuel elements from the reactor the interspace is flooded by a duct (not shown) from the pond and the plug 6 unlatched and withdrawn. A remotely operated grab is engaged with the closure plug 9 of a standpipe 4 and the closure plug complete with dependent fuel elements are withdrawn upwardly into the water. A reverse procedure is then adopted for the insertion of new fuel in the reactor. In the event of a breach of the primary circuit within the primary containment, for example, by fracture of a pressure tube, the discharge of high temperature and pressure steam increases the pressure within the containment considerably but the latches 37 prevent the plug from lifting. The restraint plates 20, co-operating with the flanges 21 forming projections of the standpipes 4, limit the lift of the tube plate and thereby prevent over stressing of the seals 27 at the periphery of the tube plate. As a result of the breach and consequent loss of coolant a differential linear thermal expansion is effected between the standpipes 4 of the two sections but the differential expansion can be accommodated by differential movement of the semi-circular sections of the flexible tube plate 1. The resulting step change in the tube plate is smoothed out at each end of the diametral slit by the flexible links so that the peripheral seal is not subjected to the step change and consequent over strain. The tube plate may be fully divided during manufacture so that transport and handling is greatly facilitated, in which case the flexible links 43 are required to be attached to the tube plate sections such as by butt welds. The tube plate 1, which is subject to the pressure of the water, is adequately supported by the standpipes and avoids the need for slidable glands (which are more prone to leakage than static glands) such as would be required if the tube plate was supported rigidly from the wall of the pond. During operation of the reactor, the rolled steel joists 42, being closely disposed above the standpipes 4, prevent full ejection of closure plugs from standpipes with consequent rapid loss of coolant and damage to the plug 6.

We claim:

1. A nuclear reactor installation comprising, a pressurized coolant circuit including vertically disposed tubes for containing nuclear fuel, said tubes having closable upper extensions for conducting fuel into and out of said tubes, structure containing a pond of liquid located above and spaced from the reactor, said extensions terminating in said pond, a flexible tube plate adapted to form the floor of said pond containing structure, said tube plate being penetrated by said tubes and being peripherally sealed to the side wall of said pond containing structure, said tubes having external flanges in abutment with and supporting said tube plate.

2. A steam generating nuclear reactor installation according to claim 1 having at least two pressurized water coolant circuits, each of said circuits including a group of said tubes with said extensions, said tube plate benig divided into flexibly interconnected sections and each of said sections being supported by the extensions of one of said groups of tubes, and comprising at least one flexible membrane for sealing together said sections of said tube plate.

3. A steam generating nuclear reactor installation according to claim 2 having two pressurized coolant circuits and wherein said tube plate is circular and substantially divided into two sections by a diametral slit and wherein are provided two flexible links spanning the ends of said diametral slit to interconnect said sections.

4. A steam generating nuclear reactor according to claim 3 wherein said flexible links are formed in the tube plate by providing arcuate slots defining extensions to each end of said diametral slit and disposed parallel to the periphery of said tube plate.

5. A steam generating nuclear reactor installation according to claim 4, wherein at least one of the tube extensions of each group has a transverse projection spaced from and disposed above said tube plate and arranged to limit upward deflection of said tube plate by abutment with said projections.

6. A steam generating nuclear reactor installation according to claim 5 having a removable plug sealable to the side wall of said pond containing structure and isolating said tube plate from said pond.

References Cited
UNITED STATES PATENTS 2,848,404    8/1958    Tveshon.
3,371,016    2/1968    Tower et al. _____ 176—53

REUBEN EPSTEIN, Primary Examiner

U.S. Cl. X.R.

176—53, 54, 62, 55, 50